US010229368B2

(12) United States Patent
Baughman et al.

(10) Patent No.: US 10,229,368 B2
(45) Date of Patent: Mar. 12, 2019

(54) MACHINE LEARNING OF PREDICTIVE MODELS USING PARTIAL REGRESSION TRENDS

(71) Applicant: International Business Machines Corporation, Armonk, NY (US)

(72) Inventors: Aaron K. Baughman, Silver Spring, MD (US); Peter K. Malkin, Yorktown Heights, NY (US); Brian M. O'Connell, Cary, NC (US); Hubert E. Pan, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 670 days.

(21) Appl. No.: 14/886,236

(22) Filed: Oct. 19, 2015

(65) Prior Publication Data

US 2017/0109649 A1    Apr. 20, 2017

(51) Int. Cl.
*G06N 99/00* (2010.01)
(52) U.S. Cl.
CPC .................................. *G06N 99/005* (2013.01)
(58) Field of Classification Search
USPC .......................................................... 706/14
See application file for complete search history.

(56) References Cited

U.S. PATENT DOCUMENTS

| 6,249,755 B1 | 6/2001 | Yemini et al. | |
| 7,720,782 B2 * | 5/2010 | Chaudhury | G06N 99/005 706/46 |
| 7,912,795 B2 * | 3/2011 | Chaudhury | G06N 99/005 705/36 R |

(Continued)

FOREIGN PATENT DOCUMENTS

| EP | 1071021 A2 | 1/2001 |
| WO | 2007100919 A2 | 9/2007 |

(Continued)

OTHER PUBLICATIONS

Failure and reliability prediction by support vecto rmachines regression of time series data, Marcio das Chagas Moura, Enrico Zio Isis Didier Lins, Enrique Droguett, Reliability Engineering & System Safety vol. 96, Issue 11, Nov. 2011, pp. 1527-1534.*
J. of the Acad. Mark. Sci. (2012) 40:pp. 8-34 DOI 10.1007/s11747-011-0278-x Specification, evaluation, and interpretation of structural equation models Richard P. Bagozzi & Youjae Yi.*
ScienceDirect Elsevier Progress in Energy and Combustion Science vol. 39, Issues 2-3, Apr.-Jun. 2013, pp. 246-283 Conceptual models for partially premixed low-temperature diesel combustion, Mark P.B. Musculus, Paul C. Miles, Lyle M. Pickett.*

(Continued)

*Primary Examiner* — Michael B Holmes
(74) *Attorney, Agent, or Firm* — Garg Law Firm, PLLC; Rakesh Garg; Christopher K. McLane

(57) ABSTRACT

An input is selected from a set of inputs used by a prediction model to produce an initial predicted value of an outcome. A changed predicted value of the outcome is produced by removing the selected input from the inputs to the model. An actual value of the outcome is obtained. A label residual is computed using the actual value and the changed predicted value. A second prediction model is formed to predict a value of the selected input. A variable residual is computed using an actual value and the predicted value of the selected input. An expression is generated of a plot of the label residual and the variable residual. The selected input is transformed, to form a transformed selected input, where the model produces a second predicted value of the outcome by using the transformed selected input.

20 Claims, 7 Drawing Sheets

(56) References Cited

U.S. PATENT DOCUMENTS

| | | | |
|---|---|---|---|
| 9,481,367 B1* | 11/2016 | Gordon | B60W 30/09 |
| 9,483,948 B1* | 11/2016 | Gordon | G08G 1/166 |
| 9,536,204 B2* | 1/2017 | Baughman | G06N 5/043 |
| 9,646,264 B2* | 5/2017 | Baughman | G06N 5/022 |
| 9,705,779 B2* | 7/2017 | Baughman | H04L 43/16 |
| 9,722,907 B2* | 8/2017 | Baughman | H04L 43/16 |
| 9,773,419 B1* | 9/2017 | Gordon | G08G 5/0069 |
| 9,860,134 B2* | 1/2018 | Bogdany | G06T 11/206 |
| 9,881,487 B2* | 1/2018 | Amato | G08B 13/19684 |
| 9,882,836 B2* | 1/2018 | Baughman | H04L 47/823 |
| 9,953,029 B2* | 4/2018 | Baughman | G06F 17/2818 |
| 10,043,194 B2* | 8/2018 | Baughman | G06Q 30/0202 |
| 10,067,935 B2* | 9/2018 | Baughman | G06F 17/2818 |
| 2006/0074290 A1 | 4/2006 | Chen et al. | |
| 2008/0154693 A1 | 6/2008 | Bateni | |
| 2008/0154814 A1* | 6/2008 | Chaudhury | G06N 99/005 706/14 |
| 2010/0185416 A1 | 7/2010 | Furem et al. | |
| 2010/0198762 A1* | 8/2010 | Chaudhury | G06N 99/005 706/12 |
| 2012/0089396 A1 | 4/2012 | Patel et al. | |
| 2014/0310714 A1 | 10/2014 | Chan et al. | |
| 2014/0336960 A1 | 11/2014 | Haghighat-Kashani et al. | |

FOREIGN PATENT DOCUMENTS

| | | |
|---|---|---|
| WO | 2010138975 A1 | 12/2010 |
| WO | 2014106124 A1 | 7/2014 |
| WO | 2015006517 A2 | 1/2015 |

OTHER PUBLICATIONS

ScienceDirect Elsevier Expert Systems with Applications vol. 39, Issue 11, Sep. 1, 2012, pp. 10191-10201 Expert system for open-loop power control of wireless local area networks, Tapio Frantti.*

Cleophas et al.,; "Partial Correlations", In Machine Learning in Medicine, pp. 55-64. Springer Netherlands, 2013.

Kock; Theorizing Based on Evolutionary Psychology, Information Systems Theorizing Based on Evolutionary Psychology: An Interdisciplinary Review and Theory Integration Framework, http://www.misq.org/archivist/appendices/KockAppendices.pdf., MIS Quarterly vol. 33 No. 2, pp. 395-418/Jun. 2009.

Daly et al; Learning Bayesian networks: Approaches and issues, May 2011 The Knowledge Engineering Review , vol. 26 Issue 2, Publisher: Cambridge University Press, Bibliometrics: Downloads (6 Weeks): n/a, Downloads (12 Months): n/a, Downloads (Overall): n/a.

Su et al; A Partial Least Squares Regression-Based Fusion Model for Predicting the Trend in Drowsiness, Systems, Man and Cybernetics, Part A: Systems and Humans, IEEE Transactions on vol. 38 , Issue: 5, DOI: 10.1109/TSMCA.2008.2001067, Publication Year: 2008 , pp. 1085-1092, Papers (9).

Neapolitan; Probabilistic Methods for Bioinformatics with an Introduction to Bayesian Networks, ISBN: 978-0-12-370476-4, 2009 by Elsevier Inc.

Qi-ting et al; An experimental study on paddy soil moisture inversion based on emissive hyperspectra, Agro-Geoinformatics (Agro-Geoinformatics), 2012 First International Conference on DOI: 10.1109/Agro-Geoinformatics.2012.6311675.

Shankar; Novel classification and segmentation techniques with application to remotely sensed images, Jan. 2007 Transactions on rough sets VII, Publisher: Springer-Verlag, Bibliometrics: Downloads (6 Weeks): n/a, Downloads (12 Months): n/a, Downloads (Overall): n/a, Citation, Count: 2.

Verma et al; Evidence generation for Dempster-Shafer fusion using feature extraction multiplicity and radial basis network, Emerging Trends in Electrical and Computer Technology (ICETECT), 2011 International Conference on DOI: 10.1109/ICETECT.2011. 5760177, Publication Year: 2011 , pp. 542-545, Papers (1).

Wu et al; An exploratory study of the impact of organizational factors on employee knowledge sharing, Information Science and Service Science and Data Mining (ISSDM), 2012 6th International Conference on New Trends in Publication Year: 2012 , pp. 427-432.

Huang et al; Large-scale regulatory network analysis from microarray data: modified Bayesian network learning and association rule mining, Aug. 2007 Decision Support Systems, vol. 43 Issue 4, Publisher: Elsevier Science Publishers B. V., Bibliometrics: Downloads (6 Weeks): n/a, Downloads (12 Months): n/a, Downloads (Overall): n/a, Citation Count: 12.

Chengxue et al; Correlation Analysis between Airfoil Icing and Icing Cloud Conditions Based on PLS Methods, Optoelectronics and Image Processing (ICOIP), 2010 International Conference on vol. 1, DOI: 10.1109/ICOIP.2010.114.

* cited by examiner

MACHINE LEARNING OF PREDICTIVE MODELS USING PARTIAL REGRESSION TRENDS

TECHNICAL FIELD

The present invention relates generally to a method, system, and computer program product for forecasting future events. More particularly, the present invention relates to a method, system, and computer program product for machine learning of predictive models using partial regression trends.

BACKGROUND

A predictive model (also known as a forecaster, a forecasting model, a prediction model, or an autoregressive model) is a software-implemented model of a system, process, or phenomenon, usable to forecast—or predict—a value, output, or outcome expected from the system, process, or phenomenon. The system, process, or phenomenon that is modeled is collectively and interchangeably referred to hereinafter as a "process" unless specifically distinguished where used.

A simulation is a method of computationally looking ahead in the future of the execution of the process to predict one or more events that can be expected to occur in the process at that future time. A predicted event is a value, output, or outcome of the process at the end of a look-ahead period configured in the simulation.

A variable value that affects an outcome of a process is called a factor or a feature. A predicted event or an outcome of a process—to wit, a prediction—is dependent upon, affected by, or otherwise influenced by a set of one or more factors. A factor can be independent of and not affected by other factors participating in a given model. An independent factor is also called an independent variable. A factor can be dependent upon a combination of one or more other independent or dependent factors. A dependent factor is also called a dependent variable.

A predictor is a factor, and can be an independent variable or a dependent variable. Under certain circumstances, dependent variable may not act as a predictor in a model but as a predicted outcome of the model.

A predictive model has to be trained before the model can reliably predict an event in the future of the process with a specified degree of probability or confidence. Usually, but not necessarily, the training data includes past or historical outcomes of the process. The training process adjusts a set of one or more parameters of the model.

A predictive model can also self-train using a machine learning process. The predictive model selects some of its own prior outputs depending upon some combination of the validity, accuracy, repeatability, and reliability of those prior outputs. The predictive model then consumes the selected prior outputs as training inputs, to improve some combination of the validity, accuracy, repeatability, and reliability of future outputs. For example, a predictive model compares a prediction from a prior output with an actual outcome of the event, which is also referred to as a ground truth. The self training seeks to improve the accuracy of the model by attempting to reduce a difference between the prediction and the ground truth in future predictions.

Time series forecasting uses one or more forecasting models to regress on independent variables to produce a dependent variable. For example, if Tiger Woods has been playing golf very quickly, the speed of play is an example of an independent variable. A forecasting model regresses on historical data to predict the future play rates. The future play rate is a dependent variable.

Generally, a predictive model can be used to predict any type of event. For example, a model can be configured to predict a load on a server at a future time as a consequence of a number of tennis matches going on at the time, a number of social media messages being communicated at the time about the matches, and a number of web accesses by users while the matches are being played. The load is the predicted event, where the prediction of the load has been modeled to have some relationship with the number of matches, the number of messages, and the number of web accesses, each of those numbers being an independent variable or a predictor that forms an input to the model.

SUMMARY

The illustrative embodiments provide a method, system, and computer program product for machine learning of predictive models using partial regression trends. An embodiment includes a method for improving a prediction model. The embodiment selects, at an application executing using a processor and a memory, an input from a set of inputs, the set of inputs being used by the prediction model to produce an initial predicted value of an outcome at a future time. The embodiment produces, using the processor and the memory, a changed predicted value of the outcome by removing the selected input from the set of inputs supplied to the model. The embodiment obtains an actual value of the outcome at the future time. The embodiment computes a label residual using the actual value of the outcome and the changed predicted value. The embodiment forms a second prediction model to predict a value of the selected input at the future time. The embodiment computes a variable residual using an actual value of the selected input at the future time and the predicted value of the selected input. The embodiment generates an expression of a plot of the label residual and the variable residual. The embodiment transforms the selected input, to form a transformed selected input, wherein the model produces a second predicted value of the outcome by using the transformed selected input.

Another embodiment includes a computer program product for improving a prediction model, the computer program product comprising one or more computer-readable storage devices, and program instructions stored on at least one of the one or more storage devices.

Another embodiment includes a computer system for improving a prediction model, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
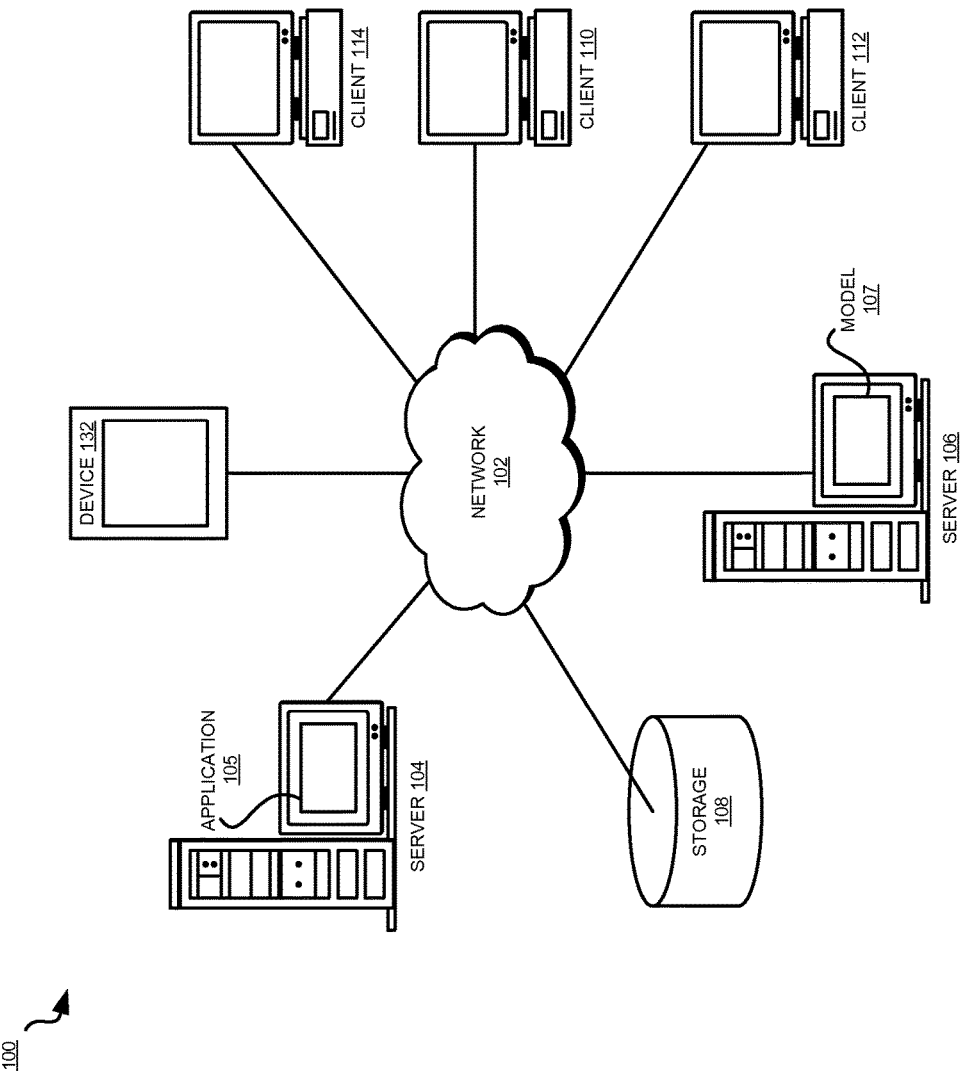
FIG. 1 depicts a block diagram of a network of data processing systems in which illustrative embodiments may be implemented.

The illustrative embodiments recognize that if a relationship between a particular independent variable and the dependent variable is not consistent with the model, the relevance of the independent variable to the prediction of the model decreases. In such a case, data scientists rely on the power of other independent variables for forecasting or predicting.

Generally, a complexity or degree of a model does not change based on a number of predictors—dimensions—participating in the mode. Therefore, dimensional reduction is often performed to simplify the model. The illustrative embodiments recognize that when an independent variable is regarded as less relevant than others due to such inconsistency, often, the reducing relevance results in the independent variable being eliminated from the model entirely for dimensional reduction of the model. The illustrative embodiments recognize that in such elimination, potentially, a high value variable may be eliminated from consideration during dimensionality reduction since it does not add value to the determination of the dependent variable.

Thus, the illustrative embodiments recognize that a need exists to determine a predictor's relationship with a prediction in a model such that the relationship is representative of an extent to which the prediction is caused by the predictor, to wit, a causation relationship between the predictor and the prediction. Furthermore, the illustrative embodiments recognize that a need exists to determine a manner in which a trend or change in the predictor is correlated to a trend or change in the prediction, to wit, a correlation between the predictor and the prediction.

The illustrative embodiments used to describe the invention generally address and solve the above-described problems and other problems related to training a predictive model. The illustrative embodiments provide a method, system, and computer program product for machine learning of predictive models using partial regression trends.

An embodiment executes as an application in, or in conjunction with, a data processing system used for executing a predictive model. Hereinafter, some embodiments are described using independent variables as the predictors without implying any limitation or exclusion of dependent variable, which can also be used as predictors in some cases. A prediction of an embodiment can be an outcome of an event or another predictor within the scope of the illustrative embodiments.

An embodiment determines a set of predictors used in a given model (the first model), which produces a prediction. The embodiment executes the model using the set of predictors to produce an initial prediction.

As an example, assume that an example of the first model is a model that predicts the load on a server that is serving tennis match related information. The set of predictors for such an example model includes a number of tennis matches being played at a given time of the prediction, a number of social media messages about one or more matches at the time, and a number of web accesses by users during a match. Using all three predictors, assume that the prediction of the server load is S.

The embodiment selects a predictor from the set to determine the relationship of the selected predictor with the model's predictions. The embodiment excludes the selected predictor from the set of predictors to form a subset of predictors. The embodiment re-executes the model with the subset of predictors to produce a changed prediction.

For example, in the server load prediction model, assume that the embodiment removes the number of social media messages from the set of predictors, and executes the model only with the number of matches and the number of web accesses. When executed with this subset of predictors, the prediction of the server load is S'.

An embodiment computes a residual using the initial prediction and the changed prediction. This residual is a value that is referred to herein as a label residual. For example, one embodiment computes a label residual as a difference by subtracting the changed prediction from the actual outcome (ground truth) that was predicted as the initial prediction. For example, in case of the server load prediction model, the result of an actual server load at a future time for which the initial prediction was made and S'. From this disclosure, those of ordinary skill in the art will be able to use the ground truth corresponding to the initial prediction and the changed prediction to compute the label residual in other ways as well and the same are contemplated within the scope of the illustrative embodiments.

Several values of the label residual are produced in this manner by regressing the model over the subset of predictors. This manner of evaluating the change in the label residual relative to the eliminated selected predictor is called partial regression.

An embodiment constructs a second model. The second model uses the above-described subset of predictors as input to produce the selected predictor as an output prediction. In other words, the second model predicts a value of the selected predictor, given the subset of predictors used to compute the label residual from the first model as described above.

For example, the embodiment constructs a second model which takes the number of matches and the number of web accesses as predictors, and produces a prediction of the number of social media messages (T').

The embodiment obtains an actual value of the selected predictor. The embodiment computes a residual using the actual value of the selected predictor and the predicted value of the selected predictor. This residual is a value that is referred to herein as a variable residual. For example, one embodiment computes a variable residual as a difference by subtracting the predicted value of the selected predictor from the actual value of the selected predictor (ground truth). For example, the embodiment obtains an actual number of social media messages (T) and computes T minus T' as the variable residual. From this disclosure, those of ordinary skill in the art will be able to use the actual and predicted values of the selected predictor to compute the variable residual in other ways as well and the same are contemplated within the scope of the illustrative embodiments.

Several values of the variable residual are produced in this manner by partial regression of the second model over the subset of predictors. A partial regression plot plots the variable residual on the X-axis of a two-dimensional graph and the label residual on the Y-axis of the graph. This plot is called a partial regression plot.

An embodiment determines an expression that represents the partial regression plot. Some non-limiting examples of such an expression may include linear equations, quadratic equations, cubic equations, and other complex mathematical expressions of any suitable order. The expression is referred to herein as a transformation function, or simply a transformation.

Different predictors selected for partial regression in the above-described manner can produce different partial regression plots, and therefore different transformations. Thus, a transformation is specific to a selected predictor. A transformation when applied to a corresponding selected predictor causes a trend or change in that selected predictor to track or match a trend or change in the prediction of a model.

For example, assume that the first model described above receives the set of predictors, which includes a selected predictor. Further assume, only as an example, that the selected predictor changes according to a cubic equation but the prediction of the first model changes according to a quadratic equation. In other words, the trend of the selected predictor and the trend of the prediction are divergent.

Further assume that a partial regression plot produced for the selected predictor in a manner described herein corresponds to a linear equation. An embodiment applies the linear equation transformation to the selected predictor. For example, the cubic trend of the selected predictor is divided by the linear transformation, resulting in a transformed selected predictor which produces a transformed tend. The transformed trend of the transformed selected predictor is quadratic because a cubic expression divided by a linear expression results in a quadratic expression. Now, the trend of the prediction and the trend of the transformed selected predictor are both quadratic expressions, albeit different quadratic expressions. The trend of the transformed selected predictor now tracks or follows the trend of the prediction much more closely than the trend of the original selected predictor does.

A method of an embodiment described herein, when implemented to execute on a device or data processing system, comprises substantial advancement of the functionality of that device or data processing system for training predictive models. For example, prior-art method of service integration may remove an important predictor from a model when the relationship of the predictor with the prediction is inconsistent, when the trend of the predictor does not appear to track the trend of the prediction, or some combination thereof. This problem is exacerbated when the model is a black-box, i.e., the relationships between the predictors and the prediction are unclear or unknown. An embodiment provides a method for determining a relationship between a predictor and a prediction (pr-prediction relationship) in a model. Any number of such relationships can be detected by an embodiment between any number of the predictors used by the model and any number of predictions produced by the model. Furthermore, an embodiment also improves the accuracy of a prediction of the model by determining, generating, and applying a transformation to a predictor of the model. Such manner of machine learning of predictive models using partial regression trends is unavailable in presently available devices or data processing systems. Thus, a substantial advancement of such devices or data processing systems by executing a method of an embodiment is in improving the understanding of a given model so that the model can be selected and trained with better or different data according to the identified pr-prediction relationships, and in improving the accuracy of a prediction of the model due to one or more predictor transformations.

The illustrative embodiments are described with respect to certain events, predictors, predictions, plots, methods of computing residuals, equations, transformations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
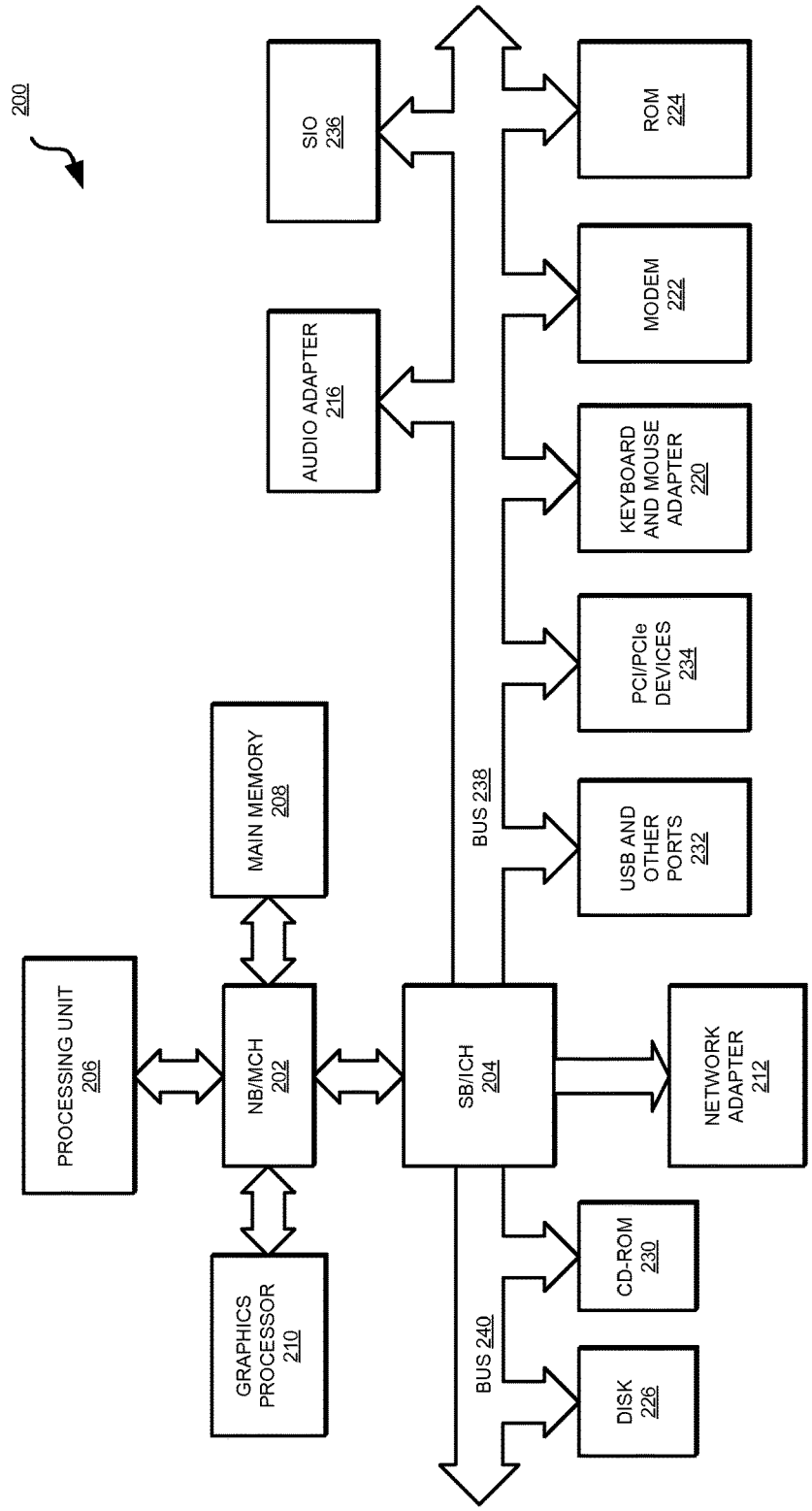
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Server 106 is usable to execute model 107, which may be any suitable predictive model, use any number or types of predictors as inputs, and produce any number or types of predictions, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD)

or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
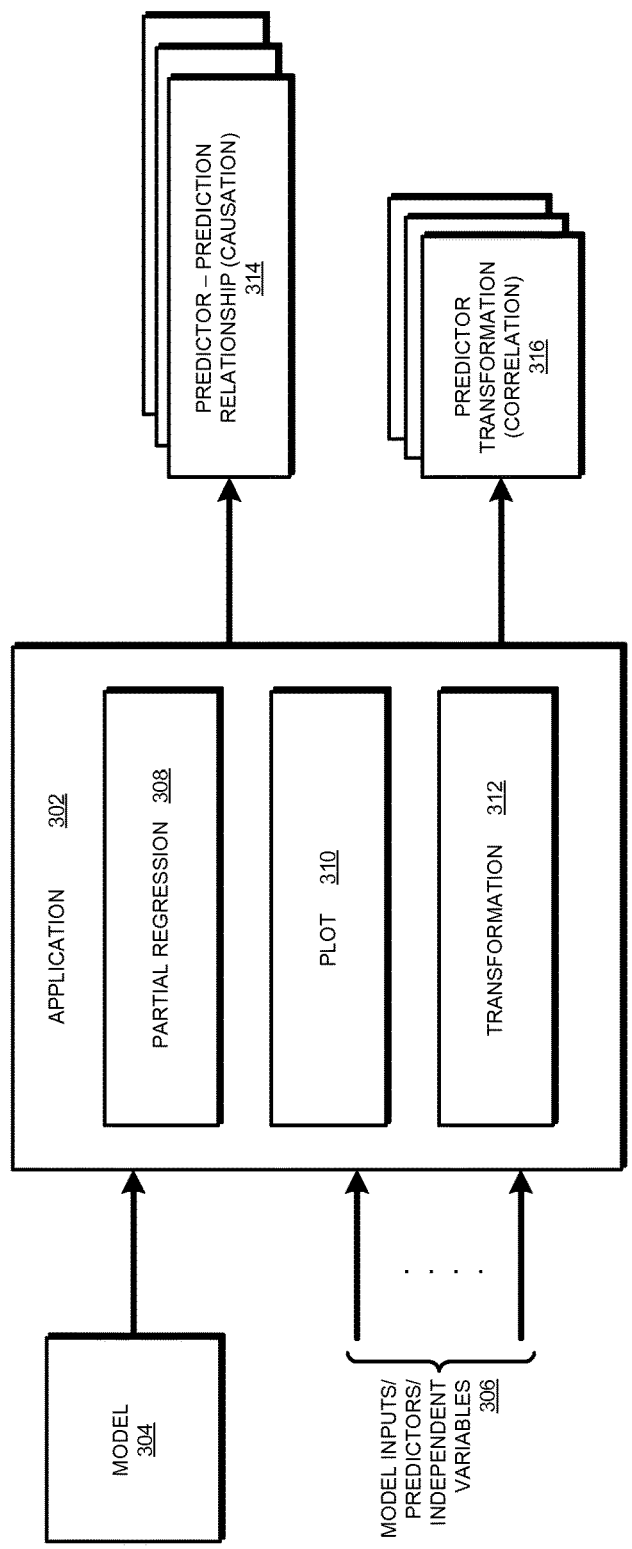
FIG. 3 depicts a block diagram of an example configuration for machine learning of predictive models using partial regression trends in accordance with an illustrative embodiment.

With reference to FIG. 3, this figure depicts a block diagram of an example configuration for machine learning of predictive models using partial regression trends in accordance with an illustrative embodiment. Application 302 is an example of application 105 in FIG. 1.

Application 302 accepts model 304 as an input. Model 304 is an example of model 107 in FIG. 1, and uses the set of predictors 306 to produce a prediction. Application 302 also accepts as input the set of predictors 306.

Component 308 eliminates a selected predictor from the set of predictors 306 to form a subset of predictors 306. Component 308 performs partial regression using model 304 on the subset of predictors 306. For example, component 308 produces the label residual and the variable residual corresponding to the eliminated predictor in a manner described herein.

From the partial regression of component 308, application 302 outputs pr-prediction relationship 314. Predictor-prediction relationship 314 expresses the causation of the eliminated predictor on the prediction of model 304. Different predictors in predictors 306 can similarly be eliminated to determine different pr-prediction relationships 314 in this manner.

Component 310 plots the label residual and the variable residual. The plot is a partial regression plot. Component 312 computes an expression that fits the partial regression plot created by component 310. The expression is transformation 316, which corresponds to the eliminated predictor. Different predictors in predictors 306 can similarly be eliminated to determine different transformations 316 in this manner.

Figure 4:
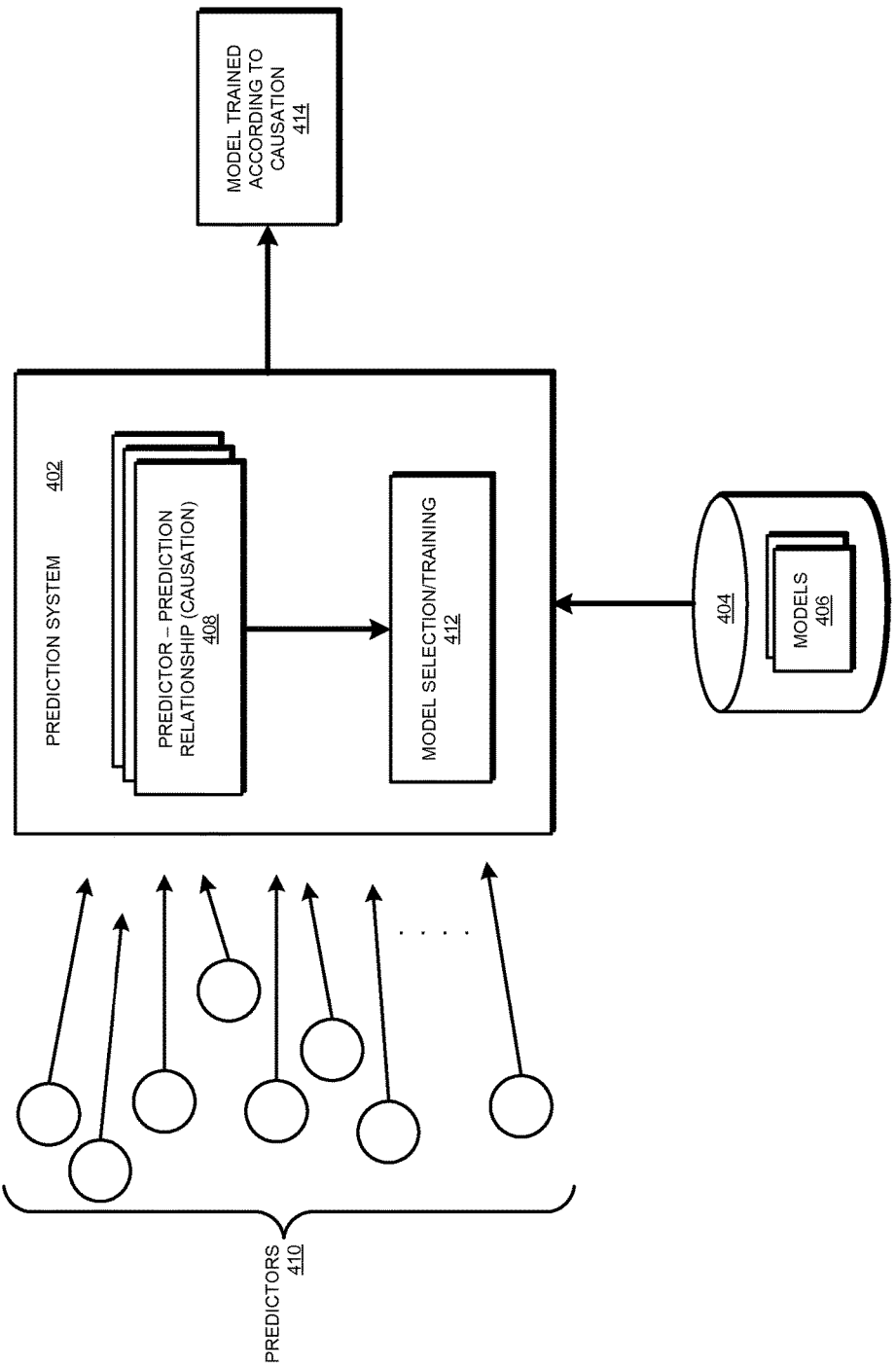
FIG. 4 depicts a block diagram of an example configuration for improved training of prediction models in accordance with an illustrative embodiment.

With reference to FIG. 4, this figure depicts a block diagram of an example configuration for improved training of prediction models in accordance with an illustrative embodiment. Prediction system 402 is an example of server 106 in FIG. 1. Repository 404 may be any suitable repository to store one or more models 406. A model in models 406 is an example of model 304 in FIG. 3. Pr-prediction causation relationships 408 are examples of pr-prediction relationships 314 in FIG. 3.

At any given time, a variety of predictors 410 is available to prediction system 402. Predictors 410 may be historical predictors for model training purposes. Depending upon causation relationships 408 component 412 selects a model from models 406, if a model is not pre-selected. Depending upon causation relationships 408 component 412 selects a set of predictors from predictors 410, which is suitable for selected model 406. Component 412 trains selected model 406 using the set of predictors 410 to produce model 414. Model 414 is trained form of selected model 406, which has been trained according to the pr-prediction causation relationships 408.

Figure 5A:
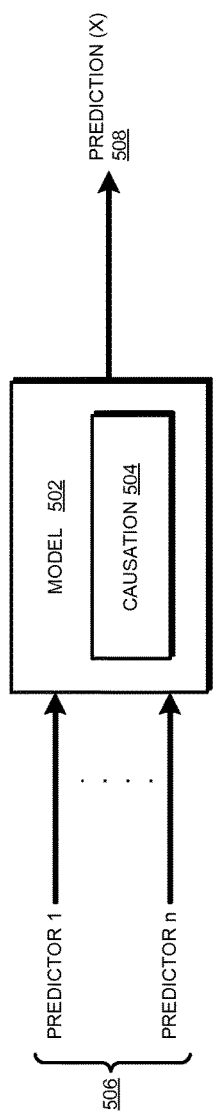
FIG. 5A depicts an improvement in a predictive model in accordance with an illustrative embodiment.

With reference to FIG. 5A, this figure depicts an improvement in a predictive model in accordance with an illustrative embodiment. Model 502 is an example of model 414 in FIG. 4. Model 502 has been trained according to causation relationship 504, which is an example of pr-prediction causation relationship 408 in FIG. 4.

Model 502, trained according to causation relationship 504 accepts n predictors 506 to produce prediction 508 (x). When an initial model is a black-box, i.e., whose inner workings are unknown or uncertain, causation relationships such as relationship 504 expose those inner workings by explaining how different predictors 506 influence prediction 508. Furthermore, causation relationships 504 enable the selection of the most suitable predictors in the set of predictors 506, such that the selected predictors are those which have at least a threshold amount of influence on the prediction, as revealed by causation relationships 504.

Figure 5B:
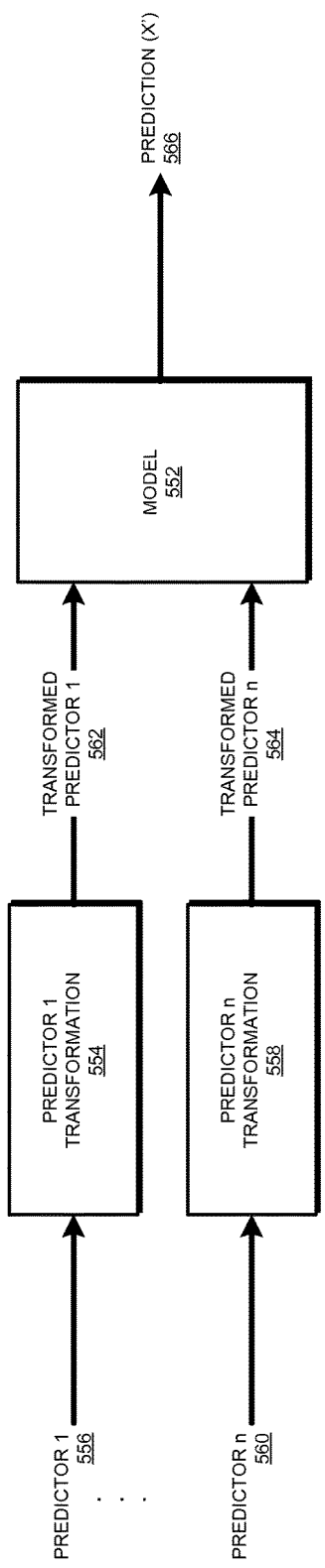
FIG. 5B depicts a block diagram to improve the accuracy of a prediction in accordance with an illustrative embodiment.

With reference to FIG. 5B, this figure depicts a block diagram to improve the accuracy of a prediction in accordance with an illustrative embodiment. Model 552 is an example of model 502 in FIG. 5A.

Transformation 554 corresponds to predictor 556 in a set of n predictors. Similarly, transformation 558 corresponds to another predictor 560 in the set of n predictors. Any number of transformations is similarly associated with any number of corresponding predictors in the set.

Transformation 554, when applied to predictor 556 produces transformed predictor 562. Similarly, transformation 558, when applied to predictor 560 produces transformed predictor 564.

Model 552 uses transformed predictors 562, 564, and any number of other such transformed predictors to produce prediction 566 (x'). Prediction 566 (x') is more accurate than a prediction made by model 406 in FIG. 4, using the set of predictors that includes predictors 556 and 560.

Figure 6:
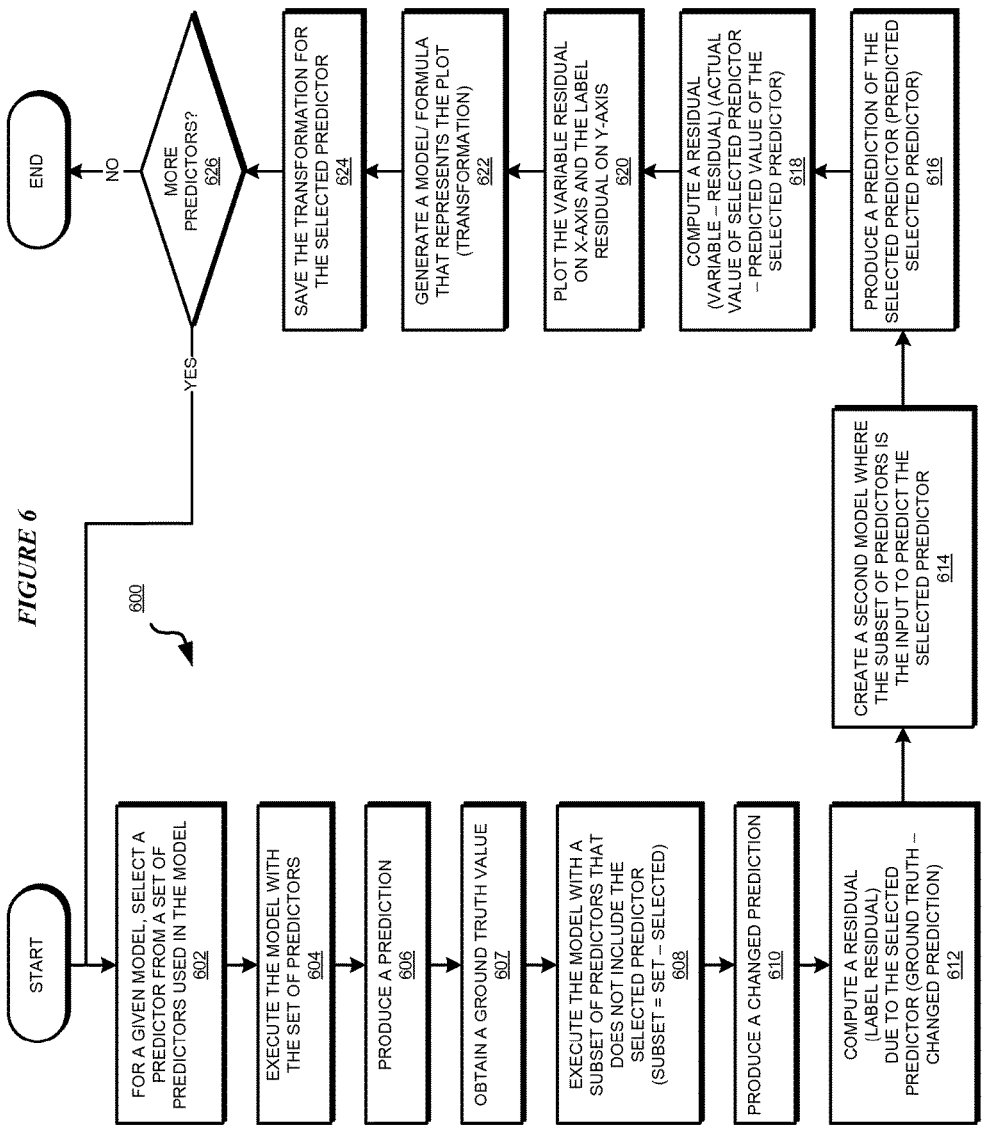
FIG. 6 depicts a flowchart of an example process for machine learning of predictive models using partial regression trends in accordance with an illustrative embodiment.

With reference to FIG. 6, this figure depicts a flowchart of an example process for machine learning of predictive models using partial regression trends in accordance with an illustrative embodiment. Process 600 can be implemented in application 302 in FIG. 3.

For a given prediction model, the application selects a predictor from a set of predictors used by the model (block 602). Optionally, the application executes the model with the set of predictors (block 604). Optionally, when the execution of block 604 is performed, the application produces a prediction for a future time (block 606). Alternatively or together with performing blocks 604 and 606, the application obtains a ground truth value of the event or variable at the future time to which the prediction of block 606 pertains (block 607).

The application executes the model with a subset of predictors, where eth subset does not includes the selected predictor but includes some or all of the remaining predictors from the set of predictors (block 608). In one embodiment, the subset of predictors is the set of predictors except the selected predictor.

The application produces a changed prediction y using the subset of predictors with the model (block 610). The application computes a label residual that can be attributed to the selected predictor, i.e. by virtue of the absence of the selected predictor as an input (block 612). In one embodiment, the label residual is the result of the ground truth of block 607 minus the changed prediction of block 610.

The application creates a second model where the subset of predictors used in block 608 is the input, and the second model predicts the selected predictor (block 614). The application executes the second model with the subset of predictors to produce a prediction of the selected predictor for a future time (block 616).

The application computes a variable residual value corresponding to the selected predictor (block 618). In one embodiment, the variable residual is the result of a ground truth value of the selected predictor at the future time for which the selected predictor was predicted minus the predicted value of the selected predictor.

The application plots the variable residual (block 620). As a non-limiting example, the application plots the variable residual on the X-axis and the label residual on the Y-axis of a graph.

The application generates an expression, model, or formula, which is representative of the plot (block 622). The expression, model, or formula forms a transformation associated with the selected predictor. The application saves the transformation for the selected predictor (block 624).

The application determines whether more predictors are to be processed in this manner (block 626). If more predictors are to be processed in this manner ("Yes" path of block 626), the application returns process 600 to block 602 to select another predictor. If more predictors are not to be processed in this manner ("No" path of block 626), the application ends process 600 thereafter.

Figure 7:
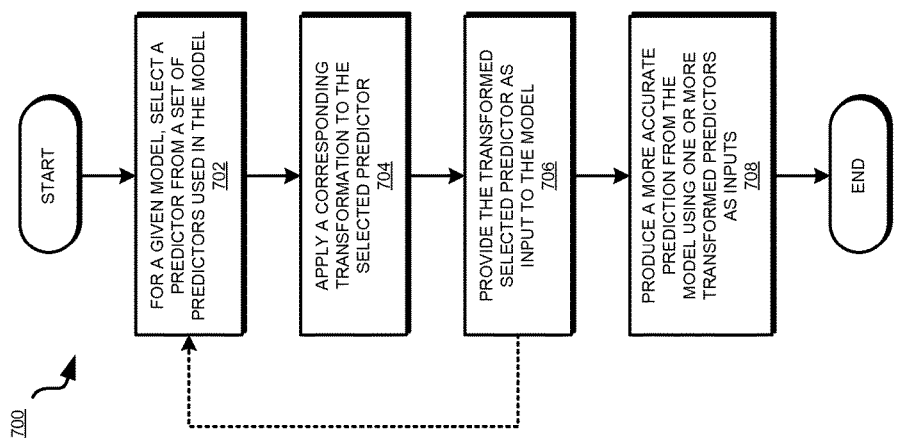
FIG. 7 depicts a flowchart of an example process for improving an accuracy of a predictive model in accordance with an illustrative embodiment.

With reference to FIG. 7, this figure depicts a flowchart of an example process for improving an accuracy of a predictive model in accordance with an illustrative embodiment. Process 700 can be implemented in application 302 in FIG. 3.

For a given model, the application selects a predictor from a set of predictors used in the model (block 702). The application applies a transformation that corresponds to the selected predictor (block 704). The application provides the transformed selected predictor as an input to the model (block 706).

The application repeats blocks 702-706 for as many predictors as may have to be transformed in a similar manner. The model produces a prediction using the one or more transformed predictors (block 708). The application ends process 700 thereafter. The prediction produces in this manner from the model is more accurate than the prediction that would be produced by the model if the predictors were provided in an un-transformed form to the model.

Thus, a computer implemented method, system or apparatus, and computer program product are provided in the illustrative embodiments for machine learning of predictive models using partial regression trends. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for improving a prediction model, the method comprising:

modifying a load prediction component for a server, the modifying enabling the load prediction component to improve with training, the modifying comprising:
selecting, at an application executing using a processor and a memory, an input from a set of inputs, the set of inputs being used by the prediction model to produce an initial predicted value of an outcome at a future time;
producing, using the processor and the memory, a changed predicted value of the outcome by removing the selected input from the set of inputs supplied to the model;
obtaining an actual value of the outcome at the future time;
computing a label residual using the actual value of the outcome and the changed predicted value;
forming a second prediction model to predict a value of the selected input at the future time;
computing a variable residual using an actual value of the selected input at the future time and the predicted value of the selected input;

generating an expression of a plot of the label residual and the variable residual; and transforming the selected input, to form a transformed selected input, wherein the model produces a second predicted value of the outcome by using the transformed selected input.

2. The method of claim 1, further comprising:

determining, from the changed predicted value and the initial predicted value a relationship between a prediction made by the prediction model and the selected input that has been removed to produce the changed predicted output; and using, responsive to the relationship exhibiting a greater than a threshold level of influence of the selected input on the prediction, the relationship to prevent the selected input from elimination from the set of inputs during a dimensionality reduction of the prediction model.

3. The method of claim 1, further comprising:

replacing, to form a revised set of input, the selected input in the set of inputs with the transformed selected input; and providing the revised set of input to the model, wherein the second predicted value of the outcome is for a second future time, and wherein the second predicted value of the outcome is more accurate than a third predicted value that would be produced for the second future time when the model uses the set of inputs instead of the revised set of inputs.

4. The method of claim 1, further comprising:

computing several label residual values at different future times; computing several variable residual values at the different future times; and plotting the several label residual values with the several variable residual values that correspond at the different future times on the plot.

5. The method of claim 1, further comprising:

supplying the subset of inputs to the second model to predict the value of the selected input.

6. The method of claim 1, further comprising:

executing, as a part of the producing the changed predicted value, the prediction model using a subset of the inputs, the subset of the inputs excluding the selected input.

7. The method of claim 6, wherein the subset comprises all inputs in the set of inputs except the selected input.

8. The method of claim 1, wherein the outcome is a result of an event at the future time.

9. The method of claim 1, wherein the outcome is a dependent variable in an event, and wherein the predicted value is a value of the dependent variable at the future time.

10. The method of claim 1, further comprising:

producing the initial prediction for the future time by executing the prediction model using the set of inputs.

11. The method of claim 1, wherein the method is embodied in a computer program product comprising one or more computer-readable storage devices and computer-readable program instructions which are stored on the one or more computer-readable tangible storage devices and executed by one or more processors.

12. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

13. A computer program product for improving a prediction model, the computer program product comprising one or more computer-readable storage devices, and program instructions stored on at least one of the one or more storage devices, the stored program instructions comprising:

program instructions to modify a load prediction component for a server, the modifying enabling the load prediction component to improve with training, the modifying comprising program instructions to select, at an application executing using a processor and a memory, an input from a set of inputs, the set of inputs being used by the prediction model to produce an initial predicted value of an outcome at a future time;

program instructions to produce, using the processor and the memory, a changed predicted value of the outcome by removing the selected input from the set of inputs supplied to the model;

program instructions to obtain an actual value of the outcome at the future time;

program instructions to compute a label residual using the actual value of the outcome and the changed predicted value;

program instructions to form a second prediction model to predict a value of the selected input at the future time;

program instructions to compute a variable residual using an actual value of the selected input at the future time and the predicted value of the selected input;

program instructions to generate an expression of a plot of the label residual and the variable residual; and program instructions to transform the selected input, to form a transformed selected input, wherein the model produces a second predicted value of the outcome by using the transformed selected input.

14. The computer program product of claim 13, further comprising:

program instructions to determine, from the changed predicted value and the initial predicted value a relationship between a prediction made by the prediction model and the selected input that has been removed to produce the changed predicted output; and program instructions to use, responsive to the relationship exhibiting a greater than a threshold level of influence of the selected input on the prediction, the relationship to prevent the selected input from elimination from the set of inputs during a dimensionality reduction of the prediction model.

15. The computer program product of claim 13, further comprising:

program instructions to replace, to form a revised set of input, the selected input in the set of inputs with the transformed selected input; and program instructions to provide the revised set of input to the model, wherein the second predicted value of the outcome is for a second future time, and wherein the second predicted value of the outcome is more accurate than a third predicted value that would be produced for the second future time when the model uses the set of inputs instead of the revised set of inputs.

16. The computer program product of claim 13, further comprising:
program instructions to compute several label residual values at different future times; computing several variable residual values at the different future times; and
program instructions to plot the several label residual values with the several variable residual values that correspond at the different future times on the plot.

17. The computer program product of claim 13, further comprising:
program instructions to supply the subset of inputs to the second model to predict the value of the selected input.

18. The computer program product of claim 13, further comprising:
program instructions to execute, as a part of the producing the changed predicted value, the prediction model using a subset of the inputs, the subset of the inputs excluding the selected input.

19. The computer program product of claim 18, wherein the subset comprises all inputs in the set of inputs except the selected input.

20. A computer system for improving a prediction model, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to modify a load prediction component for a server, the modifying enabling the load prediction component to improve with training, the modifying comprising
program instructions to select, at an application executing using a processor and a memory, an input from a set of inputs, the set of inputs being used by the prediction model to produce an initial predicted value of an outcome at a future time;
program instructions to produce, using the processor and the memory, a changed predicted value of the outcome by removing the selected input from the set of inputs supplied to the model;
program instructions to obtain an actual value of the outcome at the future time;
program instructions to compute a label residual using the actual value of the outcome and the changed predicted value;
program instructions to form a second prediction model to predict a value of the selected input at the future time;
program instructions to compute a variable residual using an actual value of the selected input at the future time and the predicted value of the selected input;
program instructions to generate an expression of a plot of the label residual and the variable residual; and
program instructions to transform the selected input, to form a transformed selected input, wherein the model produces a second predicted value of the outcome by using the transformed selected input.

* * * * *